US010024737B2

United States Patent
Araki et al.

(10) Patent No.: US 10,024,737 B2
(45) Date of Patent: Jul. 17, 2018

(54) TEMPERATURE MEASUREMENT METHOD, AND TEMPERATURE MEASUREMENT DEVICE

(71) Applicant: YAMAMOTO METAL TECHNOS CO., LTD., Osaka (JP)

(72) Inventors: Masafumi Araki, Osaka (JP); Kengo Yamamoto, Osaka (JP)

(73) Assignee: YAMAMOTO METAL TECHNOS CO., LTD., Osaka (JP)

( * ) Notice: Subject to any disclaimer, the term of this patent is extended or adjusted under 35 U.S.C. 154(b) by 304 days.

(21) Appl. No.: 14/967,365

(22) Filed: Dec. 14, 2015

(65) Prior Publication Data

US 2016/0097687 A1     Apr. 7, 2016

Related U.S. Application Data

(63) Continuation-in-part of application No. PCT/JP2014/071334, filed on Aug. 12, 2014.

(30) Foreign Application Priority Data

Aug. 13, 2013   (JP) ................................. 2013-168372

(51) Int. Cl.
  *G01K 1/00*     (2006.01)
  *G01K 13/00*    (2006.01)
  (Continued)

(52) U.S. Cl.
  CPC ............ *G01K 13/08* (2013.01); *B23K 9/0956* (2013.01); *B23K 20/1255* (2013.01);
  (Continued)

(58) Field of Classification Search
  USPC .................... 374/141, 100, 163, 153, 154; 340/870.17, 584
  See application file for complete search history.

(56) References Cited

U.S. PATENT DOCUMENTS

| 3,062,104 A | * | 11/1962 | DeFlandre | ............ B23B 29/125 384/317 |
| 4,103,588 A | * | 8/1978 | Schmid | ..................... B23C 3/06 407/120 |
| 5,573,335 A |   | 11/1996 | Schinazi | |

FOREIGN PATENT DOCUMENTS

| GB | 2438877 A | 12/2007 |
| JP | S58-149113 A | 9/1983 |

(Continued)

*Primary Examiner* — Mirellys Jagan
(74) *Attorney, Agent, or Firm* — Novick, Kim & Lee, PLLC; Jae Youn Kim

(57) ABSTRACT

In order to evaluate the cooling performance of cutting oil, cooling water, and the like more accurately than conventional means, there are provided a temperature measurement method and a temperature measurement device that can actually ascertain the temperature of a rotating tool such as a cutting tool during cutting or welding torch during welding in real time. The temperature measurement method uses a rotating holder that is rotatable around a rotating axis and has a hollow hole extending from a front end to a rear end along the rotating axis, and a rotating tool that is connected to the rotating holder and has a coaxial through hole with the hollow hole. In the temperature measurement method, a step of attaching a temperature measurement unit near the through hole of the rotating tool, a step of measuring the temperature of the rotating tool that rotates coaxially with the rotating holder using the temperature measurement unit, and a step of receiving a measurement result of the temperature measurement unit by an electronic substrate are performed in this order.

20 Claims, 9 Drawing Sheets

(51) Int. Cl.
*G01B 17/00* (2006.01)
*G01K 13/08* (2006.01)
*B23K 26/00* (2014.01)
*B23Q 17/09* (2006.01)
*B23K 9/095* (2006.01)
*B23K 20/12* (2006.01)
*B23K 26/03* (2006.01)

(52) U.S. Cl.
CPC .......... *B23K 26/00* (2013.01); *B23K 26/0093* (2013.01); *B23K 26/032* (2013.01); *B23K 26/034* (2013.01); *B23Q 17/0985* (2013.01)

(56) References Cited

FOREIGN PATENT DOCUMENTS

| | | |
|---|---|---|
| JP | H11-151637 A | 6/1999 |
| JP | 2008-524006 A | 7/2008 |
| JP | 2012-020359 A | 2/2012 |
| JP | 2012-092205 A | 5/2012 |

\* cited by examiner

TEMPERATURE MEASUREMENT METHOD, AND TEMPERATURE MEASUREMENT DEVICE

CROSS-REFERENCE TO RELATED APPLICATIONS

This application is a continuation-in-part application of PCT international application No. PCT/JP2014/071334, filed on Aug. 12, 2014, which claims the benefit of priority from Japanese Patent Application No. 2013-168372, filed on Aug. 13, 2013, the content of which is incorporated herein by reference in its entirety.

TECHNICAL FIELD

The present invention relates to a temperature measurement method and a temperature measurement device for a rotating tool used in processing. The present invention relates to, in particular, a temperature measurement method and a temperature measurement device for a cutting tool that cuts a target during cutting, and a temperature measurement method and a temperature measurement device for a rotating tool such as a welding torch.

BACKGROUND ART

The performances of cutting oil used for cutting a target have been conventionally evaluated based on "how much tool wear is suppressed (how long the tool life is)" and "how much the quality of a processed face can be improved (how much a processed face is fairly finished)". Specifically, the performances of the cutting oil have been evaluated by measuring wear of the cutting tool used in an NC lathe or a machining center, or measuring the surface roughness of the target. Such measurements take a lot of time and effort. Therefore, such measurements are hard to apply to selection and development of the cutting oil.

Three elements for improving processability of the cutting oil are lubricating performance, cooling performance, and welding resistance (Refer to Patent Literature 1, for example). Evaluating each of the three elements readily and accurately is a shortcut to selection and development of the cutting oil. Under present circumstances, the cooling performance is evaluated by placing the heated cutting tool, to which a thermocouple is attached, in the cutting oil and then, checking a temperature curve of the cutting tool.

Similarly, performances of components of various rotating tools other than the cutting tool as well as performances of used oils and cooling water are not independently evaluated readily and accurately. For example, although evaluating the temperature of the welding torch is important for verifying the welding strength and the state of the base material of a clad layer, at present, the temperature of the welding torch and the solvent is evaluated by checking the temperature curve of the base material near a molten pool and other places.

CITATION LIST

Patent Literature

[Patent Literature 1] Japanese Unexamined Patent Publication No. 2012-92205

SUMMARY OF THE INVENTION

Technical Problems

However, the above-mentioned conventional method of evaluating the cooling performance does not evaluate the quality of the cooling performance by ascertaining the temperature of the rotating tool during operation, for example, the temperature of the cutting tool during cutting or the welding torch during welding, in real time. For this reason, the temperature of the rotating tool used in the conventional method of evaluating the cooling performance may be different from the temperature of the rotating tool (cutting tool, welding torch, or the like) during actual processing (cutting, welding, or the like). Therefore, the conventional method of evaluating the cooling performance is not necessarily accurate.

Thus, an object of the present invention is to provide a temperature measurement method and a temperature measurement device that can actually ascertain the temperature of a rotating tool during actual operation, such as a cutting tool during cutting or a welding torch during welding, in real time, in order to evaluate the cooling performance of cutting oil, cooling water, or the like during welding more accurately than conventional means.

Solutions to Problems

To attain the above-mentioned object, a temperature measurement method of the present invention uses a rotating holder that is rotatable around a rotating axis and has a hollow hole extending from a front end to a rear end along the rotating axis, and a rotating tool that is connected to the rotating holder and has a coaxial through hole with the hollow hole. In the temperature measurement method, a step of attaching a temperature measurement unit near the through hole of the rotating tool, a step of measuring the temperature of the rotating tool that rotates coaxially with the rotating holder using the temperature measurement unit, and a step of receiving a measurement result of the temperature measurement unit by an electronic substrate are performed in this order.

The present invention also provides a temperature measurement device used for the temperature measurement method. The temperature measurement device includes a rotating holder that is rotatable around a rotating axis and has a hollow hole extending from a front end to a rear end along the rotating axis, a rotating tool that is connected to the rotating holder and has a coaxial through hole with the hollow hole, a temperature measurement unit that is located near the through hole of the rotating tool and measures temperature of the rotating tool coaxially rotating with the rotating holder, and an electronic substrate that receives a measurement result of the temperature measurement unit.

In the temperature measurement method and the temperature measurement device of the present invention, the rotating holder and the rotating tool are connected to each other along the rotating axis, coaxially rotate, and communicate with each other via the through hole. Thus, by attaching a temperature measurement unit such as a thermocouple to the through hole, and receiving a measurement result of the temperature measurement unit, the temperature of the rotating tool itself during actual processing (cutting or welding) can be ascertained in real time.

Using the rotating tool temperature ascertained in real time, the cooling performance of a coolant of the rotating tool during actual processing (actual operation) can be evaluated. This enables easy selection of a coolant and its amount for the rotating tool having an excellent cooling performance, and contributes to proper temperature control of a heat source.

The temperature measurement method and the temperature measurement device can use a cutting tool as the rotating tool, and ascertain the temperature of the cutting tool in real time, evaluating the cooling performance of cutting oil readily and accurately.

Specific examples of the rotating tool include a cutting tool and a welding torch. For example, in the case where the rotating tool is the cutting tool, the rotating holder is a tubular tool holder that can hold the cutting tool at a front end.

In this case, using the cutting tool temperature ascertained in real time, the cooling performance of cutting oil can be evaluated. More specifically, referring to the cutting tool temperature ascertained in real time, cutting oil with a small temperature rise can be determined as cutting oil having a high cooling performance. Accordingly, the cooling performance of the cutting oil can be evaluated more accurately than conventional means. This enables easy selection of cutting oil having an excellent cooling performance, and greatly contributes to development of cutting oil.

In the case where the rotating tool is the welding torch, the rotating holder is a tubular tool holder connected to the welding torch at a front end.

In this case, using the welding torch temperature ascertained in real time, the cooling performance of cooling water can be evaluated. Selection and development of solvents and base materials can be evaluated. Specifically, referring to the welding torch temperature ascertained in real time, cooling water supply causing a desired temperature change (adjustment of water passage and amount), discharge regions for cooling water and solvent, and proper moving speed of the welding torch can be evaluated and controlled as appropriate.

An exemplary configuration of the temperature measurement device will be specifically described below.

The electronic substrate is provided on an outer circumferential section of the tool holder. The electronic substrate includes a transmission unit that can transmit a measurement result of the temperature measurement unit to an external unit.

The transmission unit may wirelessly transmit the measurement result of the temperature measurement unit to the external unit. A power feeding unit that is provided on the outer circumferential section of the tool holder, and can feed power to the electronic substrate may be provided.

The tool holder may include a communication hole that communicates the hollow hole from an outer circumferential section of the tool holder, and electric wiring that can electrically connect the electronic substrate to the temperature measurement unit via the communication hole and the hollow hole. A cover member that is provided an outer circumferential section of the tool holder and covers at least the electronic substrate may be provided.

The tool holder may include a storage space that communicates with the hollow hole, and the electronic substrate may be stored in the storage space.

Preferably, a power feeding unit that can feed power to the electronic substrate is stored in the storage space. More preferably, a transmission unit that is provided on an outer circumferential section of the tool holder, and can wirelessly transmit a measurement result of the temperature measurement unit to an external unit is provided.

The tool holder may include a communication hole that communicates the hollow hole from an outer circumferential section of the tool holder, and electric wiring that can electrically connect the electronic substrate to the transmission unit via the communication hole and the hollow hole.

Alternatively, a stress measurement unit that is attached to an outer circumferential section of the tool holder, and can measure an external stress exerted on the cutting tool or the welding torch rotating coaxially with the tool holder is provided, and the electronic substrate includes a stress reception unit that can receive a measurement result of the stress measurement unit. A transmission unit that is provided on an outer circumferential section of the tool holder, and can wirelessly transmit a measurement result of the stress measurement unit to an external unit may be provided.

Preferably, the tool holder further includes a communication hole that communicates the hollow hole from an outer circumferential section of the tool holder, and electric wiring that can electrically connect the electronic substrate to the transmission unit via the communication hole and the hollow hole.

Advantageous Effects of Invention

According to the present invention, since the temperature of a rotating tool (cutting tool, welding torch, or the like) during actual processing can be ascertained in real time, the rotating tool itself, and cooling performances of cutting oil and cooling water can be evaluated more accurately than conventional means.

DESCRIPTION OF EMBODIMENTS

First Embodiment

A temperature measurement method and a temperature measurement device in a first embodiment of the present invention will be described below with reference to FIG. 1 to FIG. 3.

(Overall Configuration of Temperature Measurement Device 1)

Figure 1:
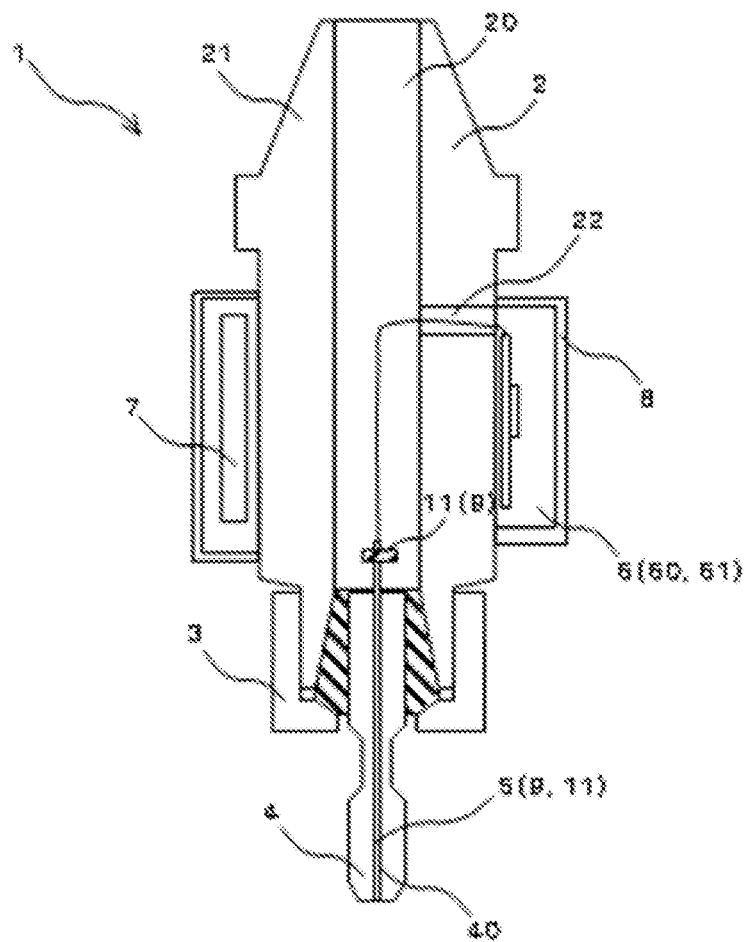
FIG. 1 is a side sectional view illustrating the internal configuration of a temperature measurement device in a first embodiment of the present invention.

As illustrated in FIG. 1, a temperature measurement device 1 includes a tubular tool holder 2, a collet nut 3, a cutting tool 4, a temperature measurement unit 5, an electronic substrate 6, a power feeding unit 7, and a cover member 8 that covers the electronic substrate 6 and the power feeding unit 7.

(Configuration of Tool Holder 2)

The tool holder 2 is rotatable around a rotating axis (not illustrated), and has a hollow hole 20 extending from a front end to a rear end along the rotating axis. The tool holder 2 can hold the cutting tool 4 at the front end. The tool holder 2 has a communication hole 22 that communicates with the hollow hole 20 from an outer circumferential section 21. As illustrated in FIG. 1, the communication hole 22 extends substantially orthogonal to the axial length of the tool holder 2.

(Configuration of Collet Nut 3)

The collet nut 3 is incorporated near the front end of the tool holder 2, and acts as a holding member that can hold the cutting tool 4 at the front end of the tool holder 2.

(Configuration of Cutting Tool 4)

The cutting tool 4 may be formed of a drill, end mill, tap, or the like, and serves to cut a target. The cutting tool 4 illustrated in FIG. 1 has a through hole 40 formed by piercing. The through hole 40 is a hole that is coaxial with the hollow hole 20 of the tool holder 2, and is a hole to which the temperature measurement unit 5 is attached. Here, the through hole 40 passes through an upper end to a lower end of the cutting tool. However, the through hole in this description also includes a semi-through hole extending from the upper end on the way to the lower end.

(Configuration of Temperature Measurement Unit 5)

The temperature measurement unit 5 may be formed of a temperature measurement element such as a thermocouple, a thermistor, or a platinum resistance thermometer sensor, and can be attached to the through hole 40 of the cutting tool 4. With being attached to the through hole 40, the temperature measurement unit 5 can measure, in real time, the temperature of the cutting tool 4 that rotates coaxially with the tool holder 2. The temperature measurement unit 5 can transmit a measurement result to the electronic substrate 6 through electric wiring (not illustrated).

(Configuration of Electronic Substrate 6)

The electronic substrate 6 is provided on the outer circumferential section 21 of the tool holder 2, with being covered with the cover member 8. The electronic substrate 6 includes a temperature reception unit 60 and a transmission unit 61. The temperature reception unit 60 can receive, in real time, the temperature of the cutting tool 4 from the temperature measurement unit 5 through electric wiring (not illustrated). The transmission unit 61 can wirelessly transmit the temperature of the cutting tool 4, which is received by the temperature reception unit 60, to an external unit.

(Configuration of Power Feeding Unit 7)

With being covered with the cover member 8, the power feeding unit 7 is provided on the outer circumferential section 21 of the tool holder 2. The power feeding unit 7 may be formed of a charging or non-charging battery, and can feed power to the electronic substrate 6.

(Flow of Electric Signal Indicating Cutting Tool Temperature Measured by Temperature Measurement Unit)

Figure 2:
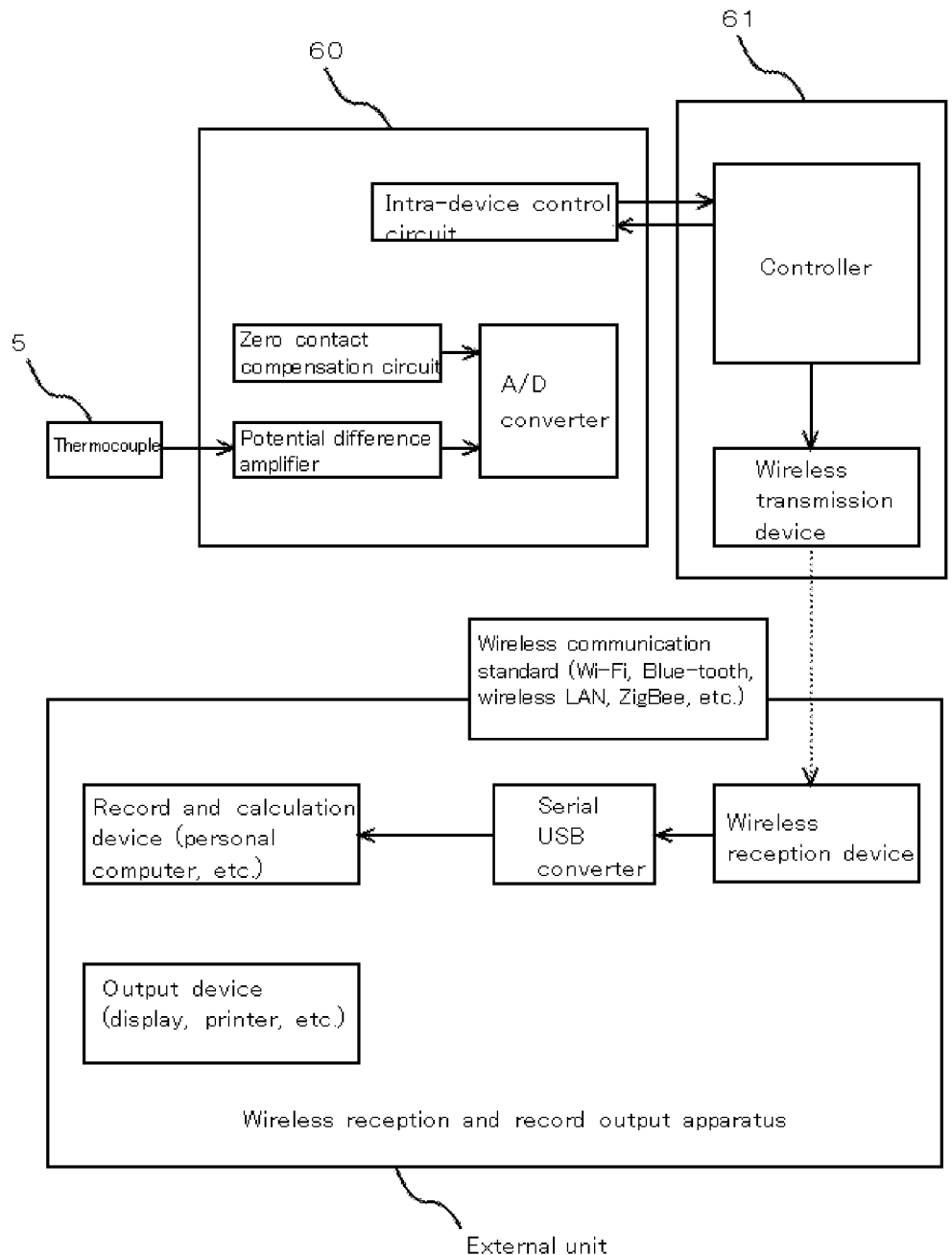
FIG. 2 is a block diagram illustrating an example of a flow of an electric signal indicating cutting tool temperature measured by a temperature measurement unit.
Figure 3:
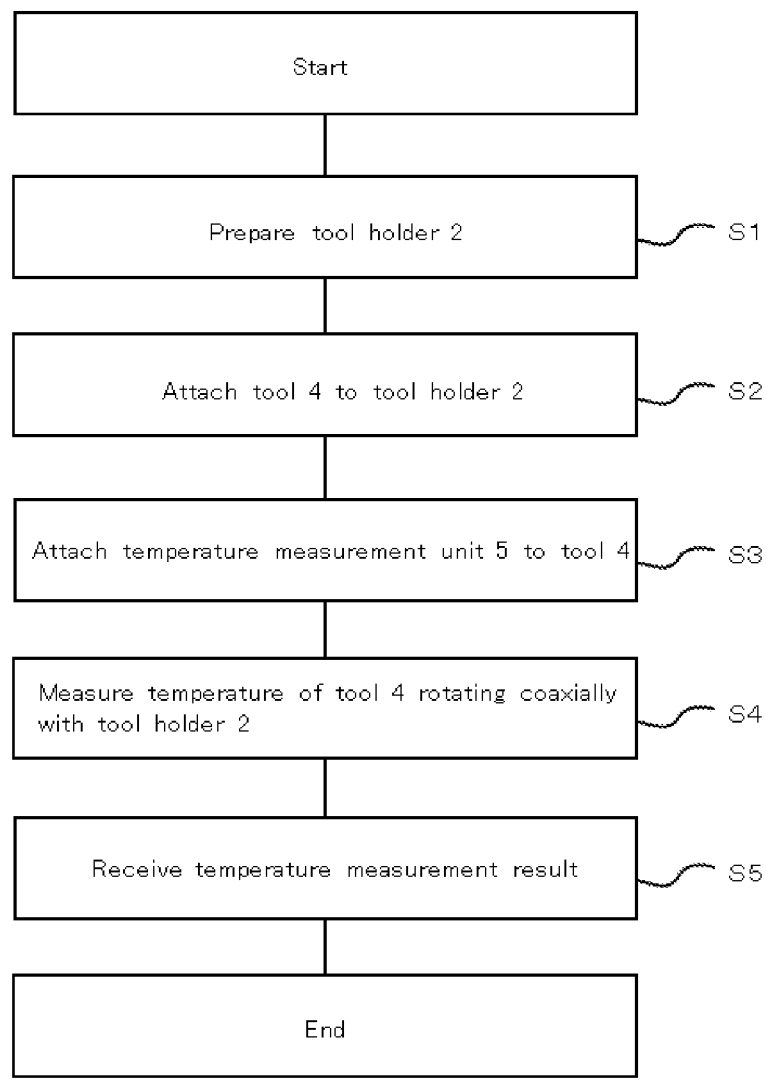
FIG. 3 is a flow chart illustrating each step of a temperature measurement method in a first embodiment of the present invention.

FIG. 2 is a block diagram illustrating an example of a flow of an electric signal indicating the cutting tool temperature measured by the temperature measurement unit. In this example, a flow of an electric signal is indicated in a case where a thermocouple constitutes the temperature measurement unit 5. Each arrow in FIG. 2 represents a flow of the electric signal indicating the temperature of the cutting tool 4, which is measured by the thermocouple, according to the mode of the signal transmission path, wire communication is expressed as a solid line, and wireless communication is expressed as a broken line. In this example, a zero contact compensation circuit, a potential difference amplification unit, an A/D (analog/digital) converter, and an intra-device control circuit constitute the temperature reception unit 60. In this example, a controller and a wireless communication device constitute the transmission unit 61.

As illustrated in FIG. 2, in this example, a wireless reception and record output apparatus constitutes the external unit. The wireless reception and record output apparatus includes a wireless reception device, a serial USB (Universal Serial Bus) converter, a record and calculation device such as a personal computer, and an output device such as a display or a printer, from the upstream side to the downstream side along the flow of the electric signal. Examples of the wireless communication standard expressed as a broken line between the wireless reception devices in FIG. 2 include Wi-Fi (Wireless Fidelity), Blue-tooth (Bluetooth), wireless LAN (Local Area Network), and ZigBee (ZigBee).

(Temperature Measurement Method)

Next, an example of a temperature measurement method of the cutting tool 4 in this embodiment will be described with reference to FIG. 3. In the exemplary temperature measurement method, a step S1 of preparing the tool holder 2, a step S2 of attaching the cutting tool 4 to the front end of the tool holder 2 via the collet nut 3, a step S3 of attaching the temperature measurement unit 5 to the through hole 40 of the cutting tool 4, a step S4 of measuring the temperature of the cutting tool 4 that rotates coaxially with the tool holder 2 by using the temperature measurement unit 5, and a step S5 of receiving a measurement result of the temperature measurement unit 5 by the electronic substrate 6 are performed in this order.

(Features of Temperature Measurement Method and Temperature Measurement Device in First Embodiment)

In the first embodiment, since the cutting tool 4 held at the front end of the tool holder 2 that is rotatable around the rotating axis (not illustrated) has the through hole 40 to which the temperature measurement unit 5 can be attached, by receiving the measurement result of the temperature measurement unit 5 by the electronic substrate 6, the temperature of the cutting tool 4 during actual processing of rotating coaxially with the tool holder 2 (actual cutting of the target) can be ascertained in real time.

Using the cutting tool temperature ascertained in real time, the cooling performance of cutting oil can be evaluated. More specifically, referring to the cutting tool temperature ascertained in real time, cutting oil with a small temperature rise can be determined to be cutting oil having a high cooling performance.

Therefore, the cooling performance of the cutting oil can be evaluated more accurately than conventional means. This enables easy selection of cutting oil having an excellent cooling performance, and contributes to development of cutting oil.

Second Embodiment

Figure 4:
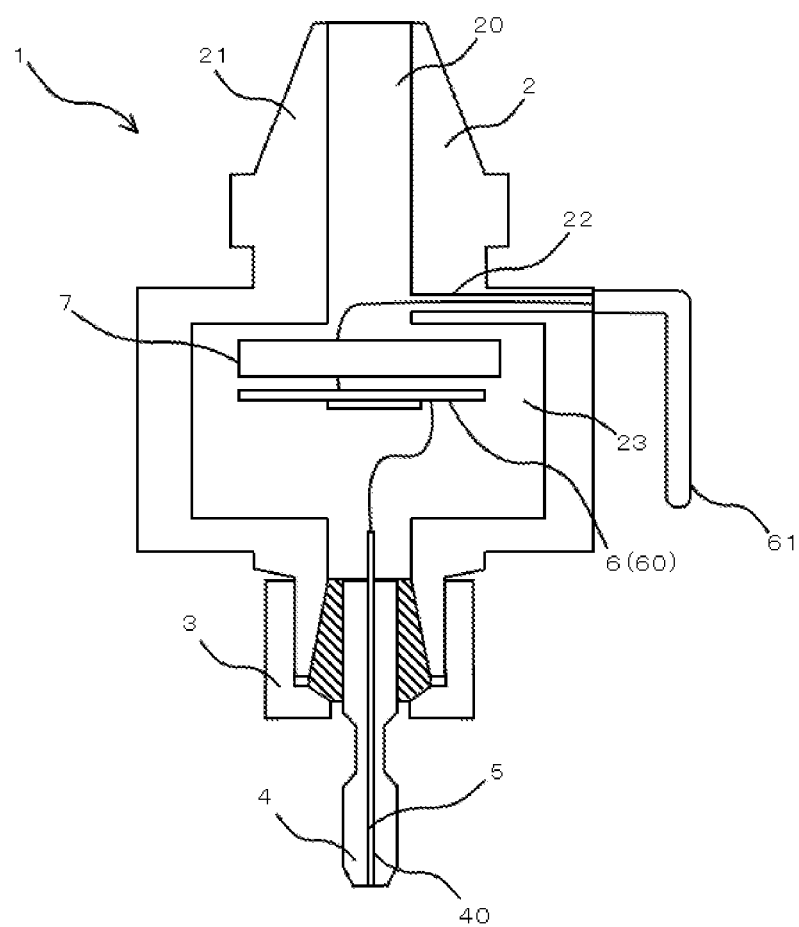
FIG. 4 is a side sectional view illustrating the internal configuration of a temperature measurement device in a second embodiment of the present invention.

A temperature measurement method and a temperature measurement device in a second embodiment of the present invention will be described below with reference to FIG. 4 and FIG. 5. As illustrated in FIG. 4, the temperature measurement device 1 in this embodiment is different from the temperature measurement device of the first embodiment (See FIG. 1) in that a tool holder 2 includes a storage space 23 communicating with a hollow hole 20. As illustrated in FIG. 4, a horizontal cross-sectional diameter of the storage space 23 is larger than a horizontal cross-sectional diameter of the hollow hole 20 so as to store an electronic substrate 6 and a power feeding unit 7. Further, the temperature measurement device 1 in this embodiment is different from the temperature measurement device in the first embodiment (See FIG. 1) in a transmission unit 61 that is provided on an outer circumferential section 21 of the tool holder 2 and can transmit the measurement result of the temperature measurement unit 5 to an external unit. As illustrated in FIG. 4, the tool holder 2 has a communication hole 22 that communicates with the hollow hole 20 from the outer circumferential section 21, and the transmission unit 61 is electrically connected to the temperature reception unit 60 of the electronic substrate 6 via the power feeding unit 7 using electric wiring extending inside the communication hole 22 and the hollow hole 20.

A flow of the electric signal indicating the cutting tool temperature measured by the temperature measurement unit in this embodiment is different from the flow of the electric signal in the first embodiment (See FIG. 2).

(Flow of Electric Signal Indicating Cutting Tool Temperature Measured by Temperature Measurement Unit)

Figure 5:
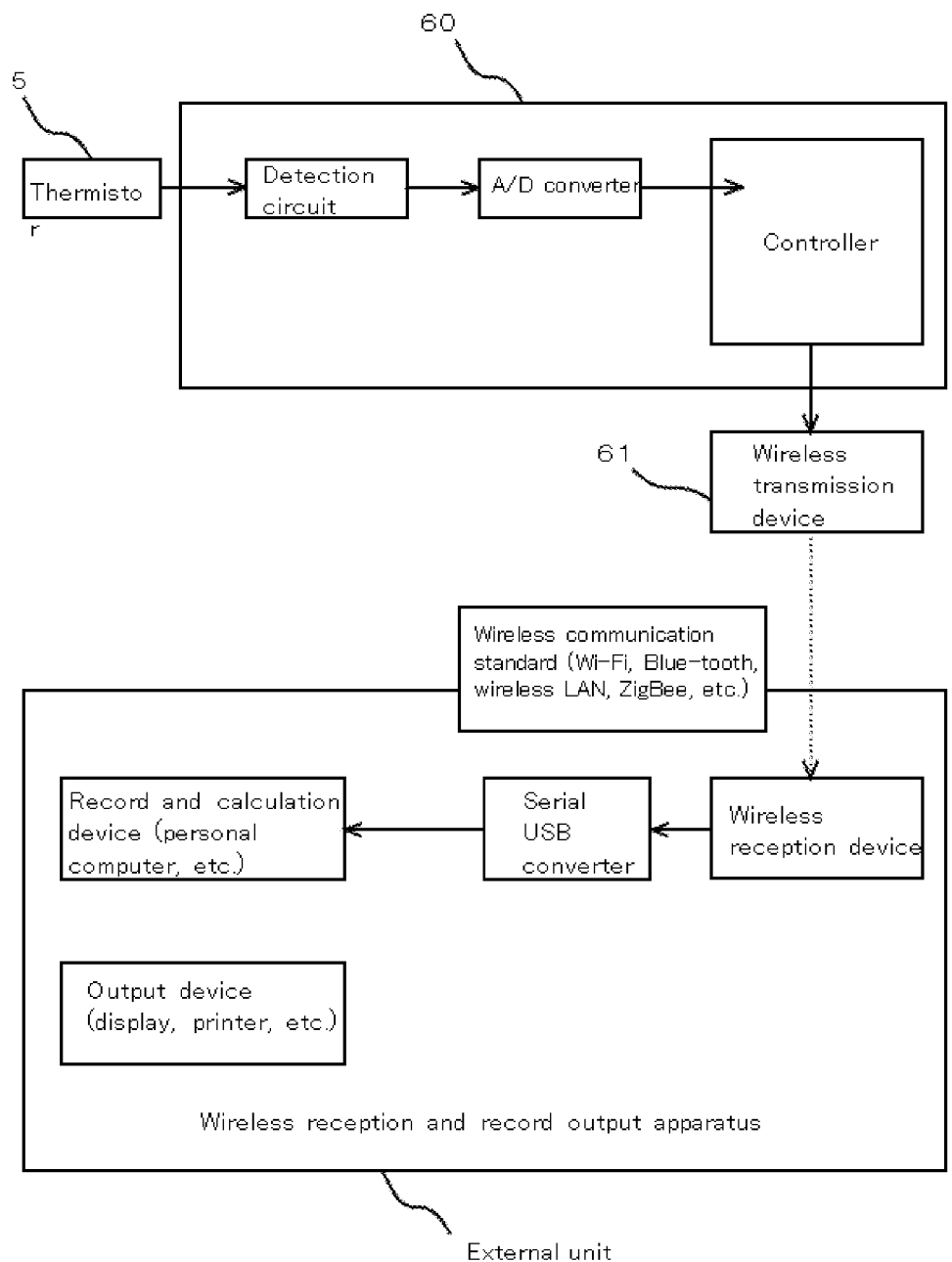
FIG. 5 is a block diagram illustrating an example of a flow of an electric signal indicating cutting tool temperature measured by a temperature measurement unit.

FIG. 5 is a block diagram illustrating an example of a flow of an electric signal indicating the cutting tool temperature measured by the temperature measurement unit. In this example, a flow of an electric signal is indicated in a case where a thermistor constitutes the temperature measurement unit 5. In this example, a detection circuit, an A/D converter, and a controller constitute the temperature reception unit 60. In this example, a wireless communication device such as a wireless transmission antenna constitutes the transmission unit 61.

As illustrated in FIG. 5, in this example, as in FIG. 2, a wireless reception and record output apparatus constitutes the external unit. A flow of the electric signal in the wireless reception and record output apparatus is the same as the flow of the electric signal in the first embodiment (See FIG. 2) and thus, detailed description thereof is omitted.

(Features of Temperature Measurement Method and Temperature Measurement Device in Second Embodiment)

The second embodiment can achieve the same effect as the first embodiment.

Further, since the storage space 23 in the tool holder 2 can store the electronic substrate 6 and the power feeding unit 7 in this embodiment, the cover member 8 required in the case where the electronic substrate 6 and the power feeding unit 7 are provided on the outer circumferential section 21 of the tool holder 2 can be omitted, reducing the number of components.

Third Embodiment

Figure 6:
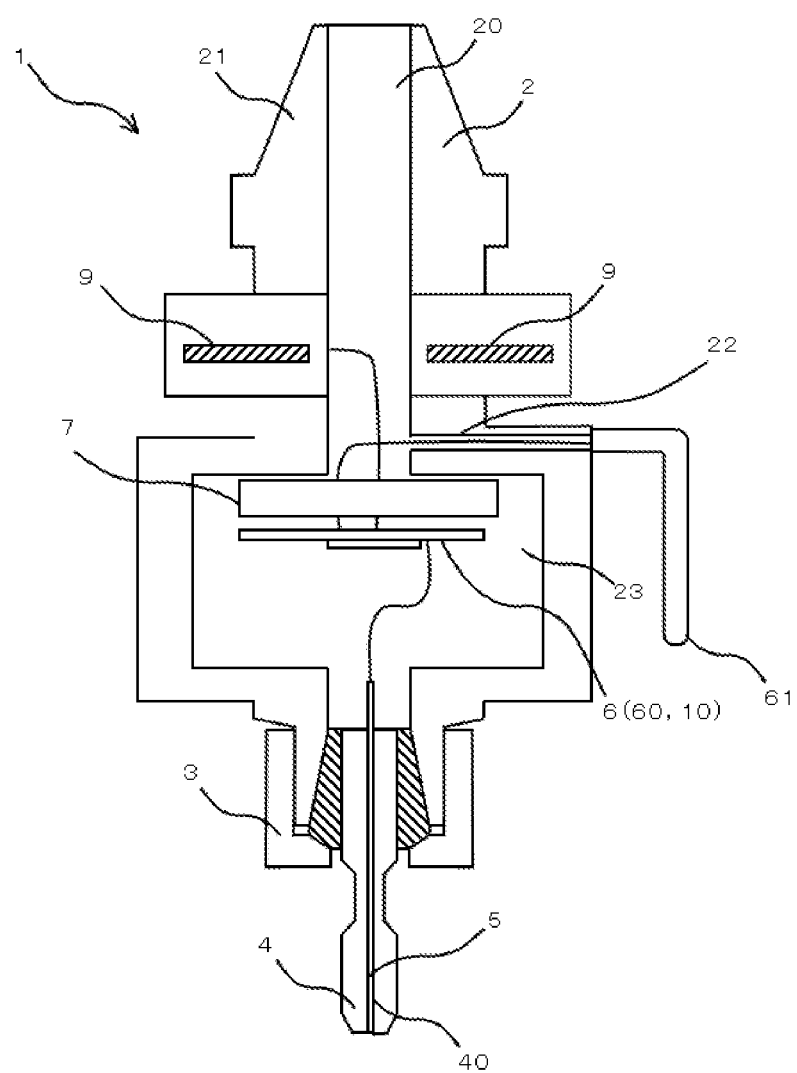
FIG. 6 is a side sectional view illustrating the internal configuration of a temperature measurement device in a third embodiment of the present invention.

A temperature measurement method and a temperature measurement device in a third embodiment of the present invention will be described below with reference to FIG. 6 and FIG. 7. As illustrated in FIG. 6, the temperature measurement device 1 in this embodiment is different from the temperature measurement device in the second embodiment (See FIG. 4) in that a stress measurement unit 9 is attached to an outer circumferential section 21 of a tool holder 2. As illustrated in FIG. 6, the stress measurement unit 9 is disposed above a storage space 23. As illustrated in FIG. 6, the temperature measurement device 1 in this embodiment is different from the temperature measurement device in the second embodiment (See FIG. 4) in that an electronic substrate 6 further includes a stress reception unit 10, and a transmission unit 61 can wirelessly transmit a measurement result of the stress measurement unit 9 to an external unit.

A flow of the electric signal indicating the cutting tool temperature measured by the temperature measurement unit (See FIG. 7) is the same as the flow of the electric signal in the first embodiment (See FIG. 2) and thus, detailed description is omitted.

The stress measurement unit 9 can be formed of a quartz piezoelectric element, a piezoelectric element, or the like, and can measure an external stress exerted on a cutting tool 4. With being attached to the outer circumferential section 21 of the tool holder 2, the stress measurement unit 9 can measure the external stress exerted on the cutting tool 4, which rotates coaxially with the tool holder 2 in real time. Then, the stress measurement unit 9 can transmit a measurement result to a stress reception unit 10 of the electronic substrate 6 via electric wiring.

The stress reception unit 10 is mounted in the electronic substrate 6, and can receive the measurement result of the stress measurement unit 9 via the electric wiring in real time.

(Flow of Electric Signal Indicating Stress Measured by Stress Measurement Unit)

Figure 7:
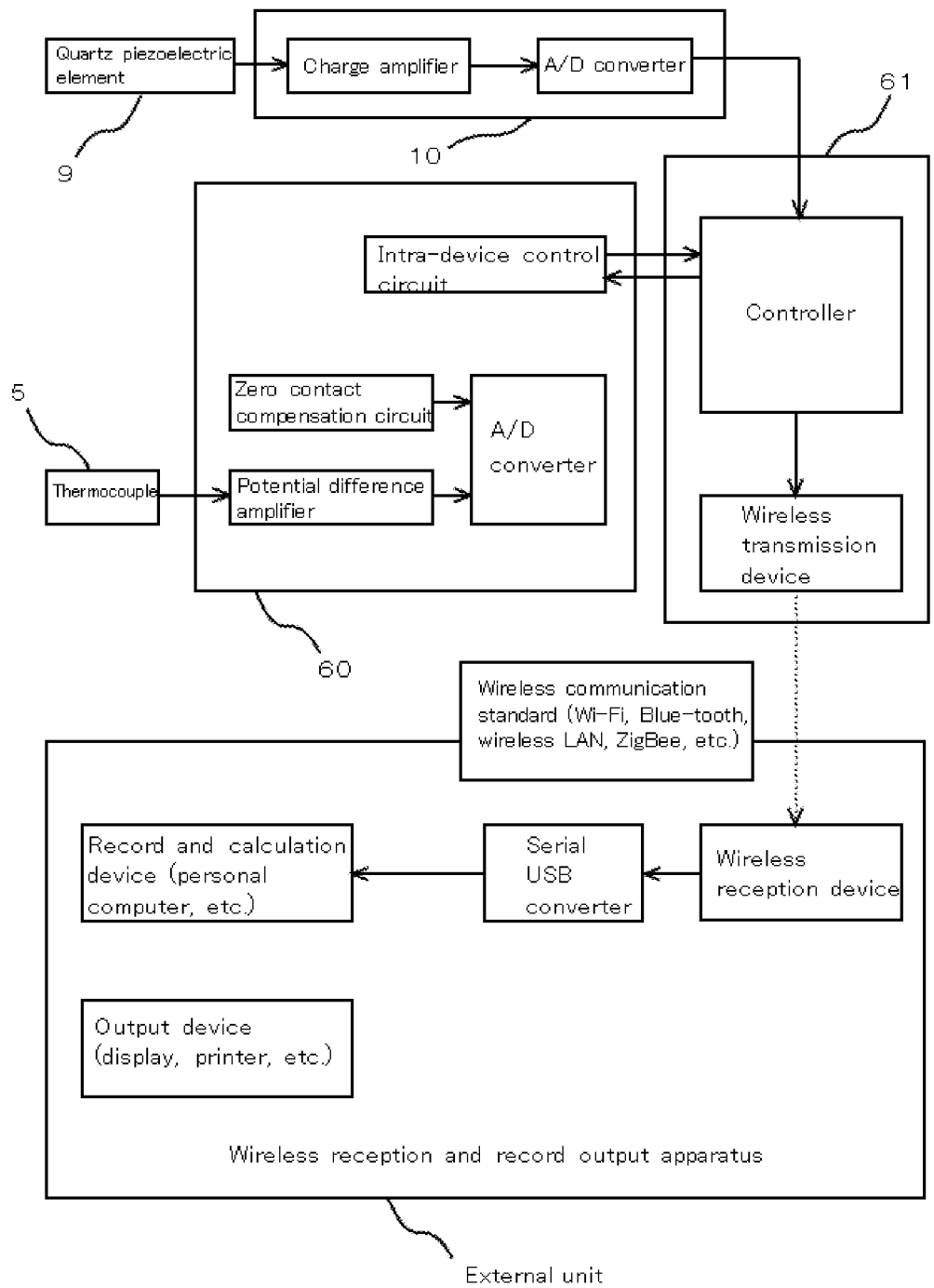
FIG. 7 is a block diagram illustrating an example of a flow of an electric signal indicating cutting tool temperature measured by a temperature measurement unit, and a stress measured by a stress measurement unit.

As illustrated in FIG. 7, an electric signal indicating the stress measured by the stress measurement unit sequentially flows through a quartz piezoelectric element, a charge amplifier, an A/D converter, and a controller from the upstream side to the downstream side. In this example, a flow of an electric signal is indicated in a case where the quartz piezoelectric element constitutes the stress measurement unit 9. In this example, the charge amplifier and the A/D converter constitute the stress reception unit 10. In this example, a controller and a wireless communication device such as a wireless transmission antenna constitute the transmission unit 61.

As illustrated in FIG. 7, in this example, as in FIG. 2, a wireless reception and record output apparatus constitutes the external unit. A flow of the electric signal in the wireless reception and record output apparatus is the same as the flow of the electric signal in the first embodiment (See FIG. 2) and thus, detailed description thereof is omitted.

(Features of Temperature Measurement Method and Temperature Measurement Device in Third Embodiment)

The third embodiment can achieve the same effect as the second embodiment.

Further, in the third embodiment, since the stress measurement unit 9 can be attached to the outer circumferential section 21 of the tool holder 2 that is rotatable around the rotating axis (not illustrated), by receiving the measurement result of the stress measurement unit 9 by the stress reception unit 10 of the electronic substrate 6, the external stress exerted on the cutting tool 4 during actual processing of rotating coaxially with the tool holder 2 (actual cutting of the target) can be ascertained in real time.

Fourth Embodiment

A temperature measurement method and a temperature measurement device in a fourth embodiment of the present invention will be described below with reference to FIG. 8. The temperature measurement device 1 in this embodiment has the same configuration as the temperature measurement device (See FIG. 6) in the third embodiment and thus, detailed description and illustration is omitted. A flow of an electric signal indicating the cutting tool temperature measured by the temperature measurement unit in this embodiment (See FIG. 8) is the same as the flow of the electric signal in the second embodiment (See FIG. 5) and thus, detailed description is omitted.
(Flow of Electric Signal Indicating Stress Measured by Stress Measurement Unit)

Figure 8:
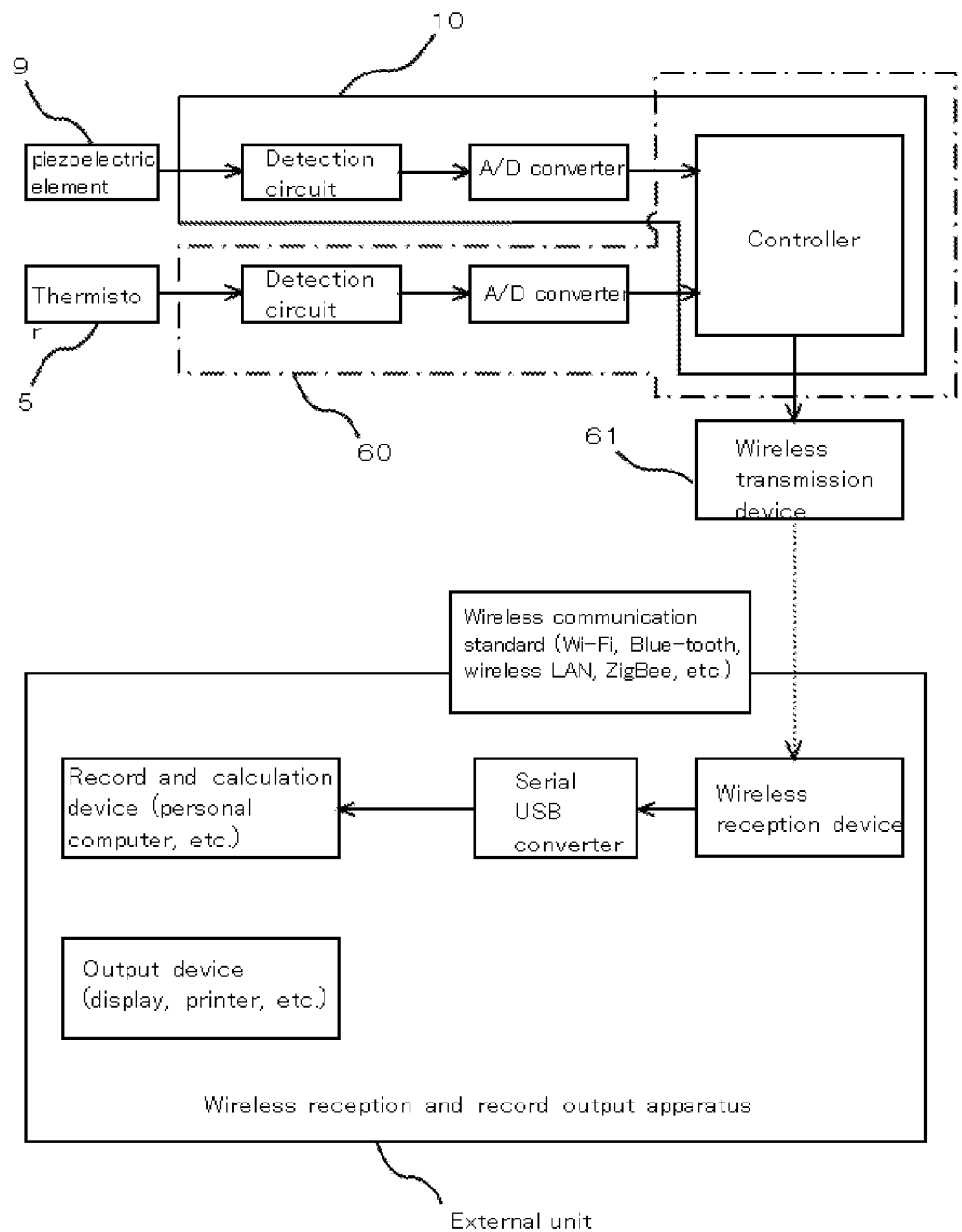
FIG. 8 is a block diagram illustrating an example of a flow of an electric signal indicating cutting tool temperature measured by a temperature measurement unit, and a stress measured by a stress measurement unit.

As illustrated in FIG. 8, an electric signal indicating the stress measured by the stress measurement unit sequentially flows through a piezoelectric element, a detection circuit, an A/D converter, and a controller from the upstream side to the downstream side. In this example, a flow of an electric signal is indicated in a case where a piezoelectric element constitutes the stress measurement unit 9. In this example, the detection circuit, the A/D converter, and the controller constitute the stress reception unit 10. In this example, a wireless communication device such as a wireless transmission antenna constitutes the transmission unit 61.

As illustrated in FIG. 8, in this example, as in FIG. 5, a wireless reception and record output apparatus constitute the external unit. A flow of the electric signal in the wireless reception and record output apparatus is the same as the flow of the electric signal in the second embodiment (See FIG. 5) and thus, detailed description is omitted.
(Features of Temperature Measurement Method and Temperature Measurement Device in Fourth Embodiment)

The fourth embodiment can achieve the same effect as the third embodiment.

Fifth Embodiment (Overall Configuration of Temperature Measurement Device 100)

Figure 9:
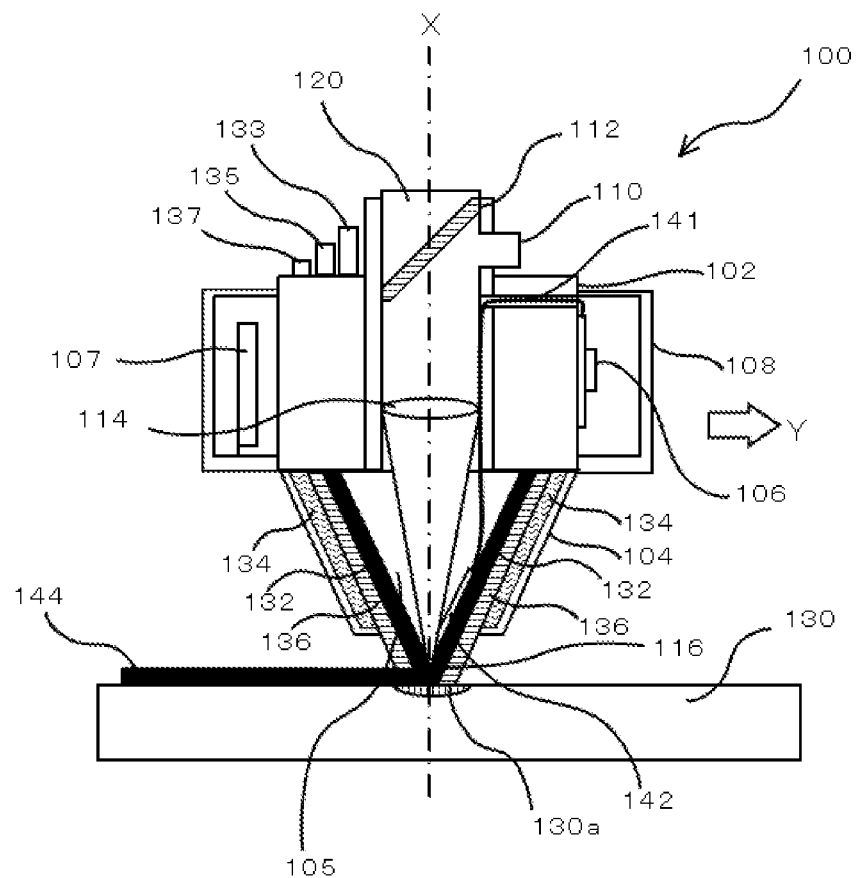
FIG. 9 is a side sectional view illustrating the internal configuration of a temperature measurement device in a fifth embodiment of the present invention.

As illustrated in FIG. 9, a temperature measurement device 100 includes a tool holder 102 as a rotating holder, a welding torch 104 as a rotating tool, a temperature measurement unit 142, an electronic substrate 106, a power feeding unit 107, and a cover member 108 that covers the electronic substrate 106 and the power feeding unit 107.

First, before describing the temperature measurement device 100, a basic concept of cladding (cladding by welding), in particular, laser cladding is briefly described.

FIG. 9 schematically illustrates laser cladding. As illustrated in FIG. 9, the temperature measurement device 100 includes the tool holder 102 and the welding torch 104 connected to the lower side of the tool holder 102 along a rotating axis X. The temperature measurement device 100 includes through holes 120, 105 connected to the tool holder 102 and the welding torch 104, respectively, and the through holes 120, 105 form a hollow laser beam path. A laser beam enters through an incidence port 110 that communicates the through hole 120 with the outside, is reflected on a mirror 112 in the vertically downward direction, and reaches a convex lens 114. The laser beam reaching the convex lens 114 is condensed, and the condensed beam is projected from an irradiation port 116 at the lower end of the through hole 105 in the welding torch 104. Then, the laser beam is condensed or defocused at a point immediately below the lower end of the welding torch 104 along the optical axis X, and is projected onto a surface of a base (base material) 130. At this time, the base 130 forms a molten pool 130a liquefied by melting at irradiation of the laser beam. However, the molten pool 130a has a small area.

The welding torch 104 includes a cladding material powder feed pipe 133 that sends cladding material powder (also referred to as merely "cladding material") 132 downward, a cooling water feed pipe 135 that sends cooling water 134 downward, and a shield gas feed pipe 137 that sends inert gas 136 downward, in this order from the central axis that is coaxial with the laser beam path X. Describing in detail, the cladding material powder feed pipe 133 is disposed on the innermost side on a horizontal plane concentric with the laser beam path X, is converged from an upper end to the optical axis X following condensing of the laser beam, and communicates with the vicinity of the irradiation port 116 at the lower end of the welding torch 104.

Though not illustrated, the cladding material powder feed pipe 133 may be one or more pipes disposed every predetermined angle on the horizontal plane, or may be a ring-like pipe that is circumferentially continuous. Accordingly, the cladding material powder feed pipe 133 pours the cladding material powder 132 from the upper end, and discharges to the position where the laser beam is projected onto the surface of the base 130, that is, the molten pool 130a on the surface of the base 130. The discharged cladding material powder 132 is heated with the laser beam and the molten pool 130a on the base 130 to form a clad layer 144 on the surface of the base 130 opposite to the moving direction of the welding torch 104 (See an arrow Y).

The shield gas feed pipe 137 is disposed on the concentric outer side (coaxial outer side) of the cladding material powder feed pipe 133 on the horizontal plane with respect to the laser beam path X, is converged from an upper end to the optical axis X following condensing of the laser beam, and communicates with the vicinity of the irradiation port 116. Accordingly, the shield gas feed pipe 135 discharges the inert gas 136 such as argon gas flowing from the upper end at the lower end. The discharged inert gas 18 is sprayed to the cladding material powder 132 (and the clad layer 144), thereby stacking the clad layer 144 on the surface of the base 130 to apply an anti-oxidation processing.

The cooling water feed pipe 137 is further disposed on the concentric outer side of the shield gas feed pipe 135, and its upper end communicates with the position above the lower end of the welding torch 104 by a predetermined distance. The clad layer 144 is rapidly cooled so as not to make the molten pool 13a on the base 130b large due to the laser beam, to form the uniformly distributed clad layer 144.
(Configuration of Tool Holder 102)

The tool holder 102 is rotatable around the rotating axis X, and has the hollow through hole 120 extending from its upper end to its lower end along the rotating axis. The tool holder 102 is integrally connected to the welding torch 104 at the lower end. The tool holder 102 has a communication hole 141 that communicates with the through hole 120 at its outer circumferential section. As illustrated in FIG. 10, the communication hole 141 extends substantially orthogonal to the axial length of the tool holder 102.
(Configuration of Temperature Measurement Unit 142)

The temperature measurement unit 142 may be formed of a temperature measurement element such as a thermocouple, a thermistor, or a platinum resistance thermometer sensor, and can be attached to a position in the through hole (hollow hole) 105 of the welding torch 104, the temperature of which is to be measured. Since the through hole 105 includes the optical axis of the laser beam, the temperature measurement unit 142 is attached to an inner wall or the like of the through hole 105 so as not to interfere with the laser beam. With being attached to the through hole 105, the temperature measurement unit 142 can measure the temperature of the welding torch 104 located at a desired position, which rotates coaxially with the tool holder 102. The temperature measurement unit 142 can transmit a measurement result to the electronic substrate 106 via the electric wiring 141.

(Configuration of Electronic Substrate 106)

With being covered with the cover member 108, the electronic substrate 106 is provided on the outer circumferential section of the tool holder 102. The electronic substrate 106 includes a temperature reception unit (reference number 60 in FIG. 2) and a transmission unit (reference number 61 in FIG. 2). The temperature reception unit can receive the temperature of the welding torch 104 from the temperature measurement unit 142 via the electric wiring 141 in real time. The transmission unit can wirelessly transmit the temperature of the welding torch 104, which is received by the temperature reception unit, to an external unit.

(Configuration of Power Feeding Unit 107)

With being covered with the cover member 108, the power feeding unit 107 is provided on the outer circumferential section of the tool holder 102. The power feeding unit 107 may be formed of a charging or non-charging battery, and can feed power to the electronic substrate 106.

Modification examples of the temperature measurement device 1 for the cutting tool 4 in the second to fourth embodiments can be applied to the temperature measurement unit 142, the electronic substrate 106, and the power feeding unit 107 of the temperature measurement device 100 illustrated in FIG. 9. For example, as in second embodiment, a storage unit for the electronic substrate 106 and so on may be provided in the tool holder 102. As in the fifth embodiment illustrated in FIG. 6, a piezoelectric element may be provided in the tool holder 102 to measure a stress exerted to the welding torch 104.

(Flow of Electric Signal Indicating Cutting Tool Temperature Measured by Temperature Measurement Unit)

For the temperature measurement device 100 in FIG. 9, the block diagram in FIG. 2 illustrating the flow of the electric signal indicating the temperature of the cutting tool 4 of the temperature measurement device 1 is referred. In this example, the flow of the electric signal is indicated in a case where a thermocouple constitutes the temperature measurement unit 5. Each arrow in FIG. 2 represents a flow of the electric signal indicating the temperature of the cutting tool 4, which is measured by the thermocouple, and according to the mode of the signal transmission path, wire communication is expressed as a solid line, and wireless communication is expressed as a broken line. In this example, a zero contact compensation circuit, a potential difference amplification unit, an A/D (analog/digital) converter, and an intra-device control circuit constitute the temperature reception unit 60. In this example, a controller and a wireless communication device constitute the transmission unit 61.

As illustrated in FIG. 2, in this example, a wireless reception and record output apparatus constitutes the external unit. The wireless reception and record output apparatus includes a wireless reception device, a serial USB (Universal Serial Bus) converter, a record and calculation device such as a personal computer, and an output device such as a display or a printer, from the upstream side to the downstream side along the flow of the electric signal. Examples of the wireless communication standard expressed as a broken line between the wireless reception devices in FIG. 2 include Wi-Fi (Wireless Fidelity), Blue-tooth (Bluetooth), wireless LAN (Local Area Network), and ZigBee (ZigBee).

Modification examples (second to fourth embodiments) (See FIG. 5, FIG. 7, and FIG. 8) of the temperature measurement device 1 for the cutting tool 4 can be applied to a flow of the electric signal in the temperature measurement device 100 illustrated in FIG. 9.

(Features of Temperature Measurement Method and Temperature Measurement Device in Fifth Embodiment)

In the fifth embodiment, since the temperature measurement unit 142 is attached in a hollow region (through hole 105) in the welding torch 104 integrally connected to the lower end of the tool holder 102 that is rotatable around the rotating axis, by receiving a measurement result of the temperature measurement unit 142 by the electronic substrate 106, the temperature of the welding torch 104 during the actual processing of rotating coaxially with the tool holder 102 (actual welding) can be ascertained in real time. Thus, using the welding torch temperature ascertained in real time, the cooling performances of the cooling water 134 and the cladding material 132 can be evaluated.

A probe for frictional stirring may be adopted as the rotating tool. The above-mentioned stress measurement unit 9 or a vibration measurement unit 11 may be attached to the tool holder 2. The stress measurement unit 9 is constituted of a strain gauge or the like, and the vibration measurement unit 11 is constituted of an acceleration sensor or the like. The stress measurement unit 9 and the vibration measurement unit 11 can measure external stress or vibration exerted on the cutting tool 4 that rotates coaxially with the tool holder 2, and the temperature measurement devices 1, 100 each include an electronic substrate having a reception unit capable of receiving a measurement result of the stress measurement unit or the vibration measurement unit.

As illustrated in FIG. 1, the stress measurement unit 9 or the vibration measurement unit 11 may be attached to the rotating tool such as the cutting tool 4, in place of the tool holder 2 or the collet 3. Attachment of the stress measurement unit 9 or the vibration measurement unit 11 to the tool holder 2 can eliminate the necessity of attaching the stress measurement unit 9 or the vibration measurement unit 11 to each rotating tool, thereby greatly reducing costs and decreasing thermal effect. On the contrary, attachment of the stress measurement unit 9 or the vibration measurement unit 11 to the rotating tool 4 requires attachment of the stress measurement unit 9 or the vibration measurement unit 11 to each rotating tool as a consumable item. However, the rotating tool displaces the most upon application of force or vibration, thereby achieving a good reactivity to even minute force.

Although the embodiments of the present invention have been describe with reference to the drawings, specific configuration is not limited to the embodiments. The scope of the present invention is defined in CLAIMS rather than in description of the embodiments, and includes all modifications within equivalents to CLAIMS in meaning.

INDUSTRIAL APPLICABILITY

The temperature measurement method and the temperature measurement device of the present invention can preferably apply to measurement of the temperature of various industrial rotating tools such as a cutting tool that cuts a target and a welding torch.

REFERENCE SIGNS LIST

1: Temperature measurement device
2: Tool holder
4: Cutting tool
5: Temperature measurement unit
6: Electronic substrate
7: Power feeding unit
8: Cover member 9: Stress measurement unit
10: Stress reception unit
20: Hollow hole
21: Outer circumferential section
22: Communication hole
40: Through hole
60: Temperature reception unit
61: Transmission unit
S1 to S5: Step

The invention claimed is:

1. A temperature measurement method that uses: a rotating holder that is rotatable around a rotating axis and has a hollow hole extending from a front end to a rear end along the rotating axis; and a rotating tool that is connected to the rotating holder and has a coaxial through hole with the hollow hole, the method comprising steps of:
   attaching a temperature measurement unit near the through hole of the rotating tool;
   measuring a temperature of the rotating tool that rotates coaxially with the rotating holder using the temperature measurement unit; and
   receiving a measurement result of the temperature measurement unit by an electronic substrate.

2. A temperature measurement device, comprising:
   a rotating holder that is rotatable around a rotating axis and has a hollow hole extending from a front end to a rear end along the rotating axis;
   a rotating tool that is connected to the rotating holder and has a coaxial through hole with the hollow hole;
   a temperature measurement unit that is located near the through hole of the rotating tool, and measures a temperature of the rotating tool coaxially rotating with the rotating holder; and
   an electronic substrate that receives a measurement result of the temperature measurement unit.

3. The temperature measurement device according to claim 2, wherein
   the rotating tool is a welding torch, and
   the rotating holder is a tubular tool holder connected to the welding torch at the front end.

4. The temperature measurement device according to claim 2, wherein
   the rotating tool is a probe for frictional stirring, and
   the rotating holder is a tubular tool holder that can hold the probe at a front end.

5. The temperature measurement device according to claim 2, further comprising a stress measurement unit or a vibration measurement unit that is attached to the rotating tool and can measure external stress or vibration exerted on the rotating tool, and
   the electronic substrate includes a stress measurement unit or a vibration measurement unit that can receive a measurement result of the stress measurement unit or the vibration measurement unit.

6. The temperature measurement device according to claim 2, wherein
   the rotating tool is a cutting tool, and
   the rotating holder is a tubular tool holder that can hold the cutting tool at the front end.

7. The temperature measurement device according to claim 6, wherein
   the electronic substrate is provided on an outer circumferential section of the tool holder.

8. The temperature measurement device according to claim 6, further comprising a power feeding unit that is provided on an outer circumferential section of the tool holder, and can feed power to the electronic substrate.

9. The temperature measurement device according to claim 6, wherein
   the tool holder includes:
   a communication hole that communicates with the hollow hole from an outer circumferential section of the tool holder; and
   electric wiring that can electrically connect the electronic substrate to the temperature measurement unit via the communication hole and the hollow hole.

10. The temperature measurement device according to claim 6, further comprising a cover member that is provided on an outer circumferential section of the tool holder, and covers at least the electronic substrate.

11. The temperature measurement device according to claim 6, wherein
    the cutting tool that is attached to the tool holder and rotates coaxially with the tool holder includes a stress measurement unit or a vibration measurement unit that can measure external stress or vibration, and
    the electronic substrate includes a stress reception unit or a vibration reception unit that can receive a measurement result of the stress measurement unit or the vibration measurement unit.

12. The temperature measurement device according to claim 6, wherein
    the electronic substrate includes a transmission unit that can transmit a measurement result of the temperature measurement unit to an external unit.

13. The temperature measurement device according to claim 12, wherein
    the transmission unit wirelessly transmits the measurement result of the temperature measurement unit to the external unit.

14. The temperature measurement device according to claim 6, further comprising a stress measurement unit that is attached to an outer circumferential section of the tool holder, and can measure an external stress exerted on the rotating tool rotating coaxially with the tool holder,
    wherein the electronic substrate includes a stress reception unit that can receive a measurement result of the stress measurement unit.

15. The temperature measurement device according to claim 14, further comprising a transmission unit that is provided on an outer circumferential section of the tool holder, and can wirelessly transmit a measurement result of the stress measurement unit to an external unit.

16. The temperature measurement device according to claim 14, wherein
    the tool holder includes:
    a communication hole that communicates with the hollow hole from an outer circumferential section of the tool holder; and
    electric wiring that can electrically connect the electronic substrate to the transmission unit via the communication hole and the hollow hole.

17. The temperature measurement device according to claim 6, wherein
    the tool holder includes a storage space that communicates with the hollow hole, and
    the electronic substrate is stored in the storage space.

18. The temperature measurement device according to claim 17, wherein
    a power feeding unit that can feed power to the electronic substrate is stored in the storage space.

19. The temperature measurement device according to claim 17, further comprising a transmission unit that is provided on an outer circumferential section of the tool holder, and can wirelessly transmit a measurement result of the temperature measurement unit to an external unit.

20. The temperature measurement device according to claim 17, wherein
the tool holder includes:
a communication hole that communicates with the hollow hole from an outer circumferential section of the tool holder; and
electric wiring that can electrically connect the electronic substrate to the transmission unit via the communication hole and the hollow hole.

* * * * *